United States Patent
Choi

(10) Patent No.: US 8,723,345 B2
(45) Date of Patent: May 13, 2014

(54) PORTABLE GENERATOR AND GENERATING METHOD

(76) Inventor: Byung-Youl Choi, Paju (KR)

( * ) Notice: Subject to any disclaimer, the term of this patent is extended or adjusted under 35 U.S.C. 154(b) by 0 days.

(21) Appl. No.: 13/699,599

(22) PCT Filed: Apr. 27, 2011

(86) PCT No.: PCT/KR2011/003094
§ 371 (c)(1),
(2), (4) Date: Nov. 21, 2012

(87) PCT Pub. No.: WO2012/133984
PCT Pub. Date: Oct. 4, 2012

(65) Prior Publication Data
US 2014/0049048 A1     Feb. 20, 2014

(30) Foreign Application Priority Data

Mar. 30, 2011   (KR) ................. 10-2011-0028879

(51) Int. Cl.
*F02B 63/04*     (2006.01)
(52) U.S. Cl.
USPC ........................... 290/1 A; 290/1 R
(58) Field of Classification Search
USPC ............................. 290/1 R, 1 A, 54
See application file for complete search history.

(56) References Cited

U.S. PATENT DOCUMENTS

| | | | | |
|---|---|---|---|---|
| 1,366,461 | A * | 1/1921 | Johnson | 362/192 |
| 4,032,829 | A * | 6/1977 | Schenavar | 322/3 |
| 6,181,110 | B1 * | 1/2001 | Lampis | 322/3 |
| 6,236,118 | B1 * | 5/2001 | Vasija et al. | 290/1 E |
| 6,460,785 | B2 * | 10/2002 | Popp | 239/533.2 |
| 7,009,350 | B1 * | 3/2006 | Gold | 318/142 |
| 8,202,325 | B2 * | 6/2012 | Albrecht-Laatsch et al. | 623/44 |
| 8,217,523 | B2 * | 7/2012 | Brown et al. | 290/1 R |

* cited by examiner

*Primary Examiner* — Nicholas Ponomarenko
(74) *Attorney, Agent, or Firm* — John K. Park; Park Law Firm

(57) ABSTRACT

A portable generator comprises a fluid pressure generator, a fluid pressure cylinder, a gas power generator, a gas generator, and a charger. The fluid pressure generator is for generating a fluid pressure by pumping, and the fluid pressure generator includes an airbag for compensating a volume change by the pressurized moving of the non-compressible fluid. The fluid pressure cylinder is connected to the fluid pressure generator and comprising a fluid pressure piston, a gas piston, and a piston rod connecting the fluid pressure piston and the gas piston. The gas power generator comprises a high pressure gas chamber, the piston rod, the gas piston of the fluid pressure cylinder, and a cycle path. The gas generator is for generating electricity with a flow of the high pressure gas moving in the high pressure gas chamber as a power source.

23 Claims, 21 Drawing Sheets

PORTABLE GENERATOR AND GENERATING METHOD

BACKGROUND OF THE INVENTION

The present invention relates to a portable generator and generating method. More particularly, this invention relates to a portable generator and generating method, which can harvest energy from various environments with a fast reaction time.

With recent developments in information telecommunication technology and digital technology, portable electronic devices such as mobile phone, smart phone, MP3, PDA, PMP, tablet PC, etc. have been introduced and used.

These devices are powered by batteries such as lithium-ion battery, nickel-cadmium battery, etc.

However, the above secondary batteries are limited in their capacity and recharging or using redundant batteries have been necessary.

Therefore, the means enabling the usage of the electronic devices even in an environment without such secondary batteries around.

To solve these problems, portable generators have been suggested by the community.

Accordingly, a need for a portable generator and generating method has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide a portable generator and generating method.

An aspect of the invention provides a portable generator.

The portable generator comprises a fluid pressure generator, a fluid pressure cylinder, a gas power generator, a gas generator, and a charger.

The fluid pressure generator is for generating a fluid pressure by pumping and pressurized moving in a direction of non-compressible fluid in a fluid-storing space, and the fluid pressure generator includes an airbag for compensating a volume change by the pressurized moving of the non-compressible fluid.

The fluid pressure cylinder is connected to the fluid pressure generator and comprising a fluid pressure piston forced to proceed by pressurizing the fluid in a cylinder tube through the pressurized moving, a gas piston, and a piston rod connecting the fluid pressure piston and the gas piston.

The gas power generator comprises a high pressure gas chamber charged with a high pressure gas compressed by a volume of the piston rod proceeding an initial charging pressure of the piston rod imparted by the proceeding of the fluid pressure piston, the piston rod, and the gas piston of the fluid pressure cylinder and a cycle path connecting a flow of the high pressure gas between the high pressure gas chamber of the piston rod and another high pressure gas chamber in front of the piston through a gas generator in the rear.

The gas generator is for generating electricity with a flow of the high pressure gas moving in the high pressure gas chamber as a power source.

The charger comprises a PCB circuit board for rectifying electricity generated by the gas generator into a DC level and a display connected electrically to the PCB circuit board so as to control a charging voltage and display a status of charging.

The fluid pressure generator may comprise a fluid container receiving the airbag in the fluid-storing space, and a valve body assembled in front of the fluid container and having a pump chamber in a vertical direction therein, a plunger pressurizing and pumping the fluid stored in the pump chamber, an intake check valve opening for intake of the fluid of the fluid-storing space into the pump chamber by pumping of the plunger, a discharge check valve discharging the pressurized fluid to the cylinder tube of the fluid pressure cylinder, an open-close flow path connecting the discharge check valve and the fluid-storing space, and a fluid return valve installed in the open-close flow path delivering the fluid in the cylinder tube into the fluid-storing space.

The plunger may be elevated by a return spring assembled elastically at a bottom portion of the pump chamber, a top end thereof is restrained to be elevated protruding to a certain height by a cap nut assembled to the valve body through screws in a top portion of the pump chamber, and the pump chamber is sealed tightly by a sealing ring assembled in a bottom portion of the cap nut.

The plunger may be provided between a protruding bolt formed in a front end of the valve body and a supporting nut assembled in the protruding bolt through screws and enabling pumping operation of elevation of axial-rotation pressurization of a pumping handle a front end of which engages through axle to a top portion of a locking plate so as to proceed and retreat over a specific distance through a disengagement prevention.

A lock protrusion of the pumping handle may be hooked to a hooking groove of the display by a retreat (push) of the locking plate in a closed state such that the pumping handle is maintained portable with the plunger lowered and folded, and the pumping handle is converted to a pumping state by disengaging the lock protrusion of the pumping handle by proceeding (pull) of the locking plate and an upward rotation by elevation of the plunger by elastic force of the return spring.

The locking plate may be retreated (pushed) into a contact groove formed around the protruding bolt of the valve body so as to be carried without further protrusions.

The fluid return valve may comprise an open-close rod and an disengagement-preventing pin penetrating and assembled to an oblong hole through a rear portion of the open-close rod, and the open-close rod comprises a flow path connecting groove, in the front and rear sides of which sealing rings for sealing a horizontal flow path connected with the open-close flow path are assembled and which connects with a flow path of the discharge check valve by proceeding (push).

The fluid pressure cylinder may comprise a cylinder tube assembled sealingly as front and rear ends of the valve body and a cylinder block of the gas power generator while receiving the discharge check valve, a fluid pressure piston assembled sealingly to the cylinder tube movably forward and backward, a piston rod connected with the fluid pressure piston, and a gas piston assembled to a front end of the piston rod and moving sealingly along inner cylindrical surface of the gas container of the gas power generator.

The piston rod may comprise a multiple-stage piston rod having a fluid pressure piston at a rear end and engaging sealing serially with the inner cylindrical surface so as to reduce an entire length of the portable generator.

The gas piston may comprise an equalizing-movement check valve for moving a high pressure gas toward the piston rod for compressing equilibrium of the high pressure gas charged in a high pressure gas chamber with respect to the proceeding direction.

The gas power generator may comprise a cylinder block, a gas container forming a high pressure gas chamber with a front end assembled with the cylinder block, an inner tube assembled at an inner cylindrical surface of the gas container, a connecting ring assembled to the gas container and a rear end of the inner cylindrical surface, and an end cap assembled sealingly with the outer cylindrical surface of the connecting ring and receiving the gas generator inside.

The high pressure gas chamber may form a cycle path penetrating the cylinder block, the gas container, the connecting ring, and the end cap by gas paths connected to one another sealingly, such that the front and rear chambers of the gas piston are connected to each other.

A regulator is for controlling an amount and speed of the high pressure gas moving to the gas generator may be provided in the cycle path.

The regulator may be provided in a control valve chamber disposed in the gas path of the cylinder block.

The regulator may comprise a guide body assembled to the control valve chamber through screws, a control bolt assembled to a central screw hole of the guide body through screws, an open-close needle controlling the degree of opening of the gas path of the control valve chamber, and a compression spring supported elastically between the control bolt and the open-close needle and controlling elastically opening of the open-close needle.

The control bolt and the open-close needle may be formed integrally.

A charging check valve for charging the high pressure gas in the high pressure gas chamber may be provided the cylinder block.

The charging check valve may comprise a sealing nut assembled to a valve chamber penetrating the high pressure gas chamber through screws, a sealing rod assembled sealingly to a charging hole of the sealing nut, and a compression spring for supporting the sealing rod elastically and closing sealingly the charging hole.

The gas generator may comprise a front cover which is received in the end cap of the gas power generator, supports rotation of a rotor while assembled and contacted to the inner cylindrical surface of the connecting ring, is connected to the gas path of the connecting ring, and communicates with the high pressure gas chamber in the front side of the gas piston, and a reverse-rotation-preventing check valve which is installed in the gas path of the front cover and prevents reverse rotation of the rotor due to a high pressure rushing in during a first physical energy charging.

Another aspect of the invention provides a generating method for a portable generator, The generating method for a portable generator comprises serially performed steps for:

(a) pressurizing fluid charged in a cylinder chamber by pumping of non-compressible fluid charged in the fluid-storing space and proceeding a fluid pressure piston and a piston rod that are retreated to the rearmost position by the compressing power;

(b) producing a resisting force (cross-sectional area of the piston rod×pressure in the cylinder×stroke) against a cross-section of the piston rod by pushing in the gas piston assembled in a front end axle (piston rod) maximally into the high pressure gas chamber where the high pressure gas is charged through the proceeding of the piston rod;

(c) storing energy applied physically while the gas piston in the high pressure gas chamber proceeds to the maximum and the high pressure gas is not compressed by the gas piston, maintains the compression equilibrium through an equalizing movement check valve of the gas piston, and is moved to the high pressure gas chamber in the side of the piston rod;

(d) releasing a stalled moving state of the fluid that is pressurized, delivered, and supported by pushing the fluid pressure piston and the piston rod and destroying the equilibrium of fluid-supporting force pushing the gas piston; and (e) moving through the cycle path the high pressure gas compressed by closing the equalizing movement check valve of the gas piston by retreating of the gas piston by the resisting force (cross-sectional area of the piston rod×pressure in the cylinder×stroke) of the compressed high pressure gas due to the destroying of the fluid-supporting force, and generating electricity using the rotor of the gas generator as a rotating power.

In the step (a), the loss of fluid moved forcefully from the fluid-storing space to the cylinder chamber by pumping may be compensated by expansion of an airbag received in the fluid-storing space.

In the step (d), the fluid which was moved forcefully may return by converting a flow path of the fluid pressure piston to a flow path of the fluid-storing space.

In the step (e), moving amount and speed of the high pressure gas may be controlled by controlling the high pressure gas circulating through the cycle path by a regulator.

The advantages of the present invention are: (1) the portable generator according to the invention is realized in a compact size and simple structures; and (2) the portable generator may be used to harvest energy from a wide range of sources.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 1:
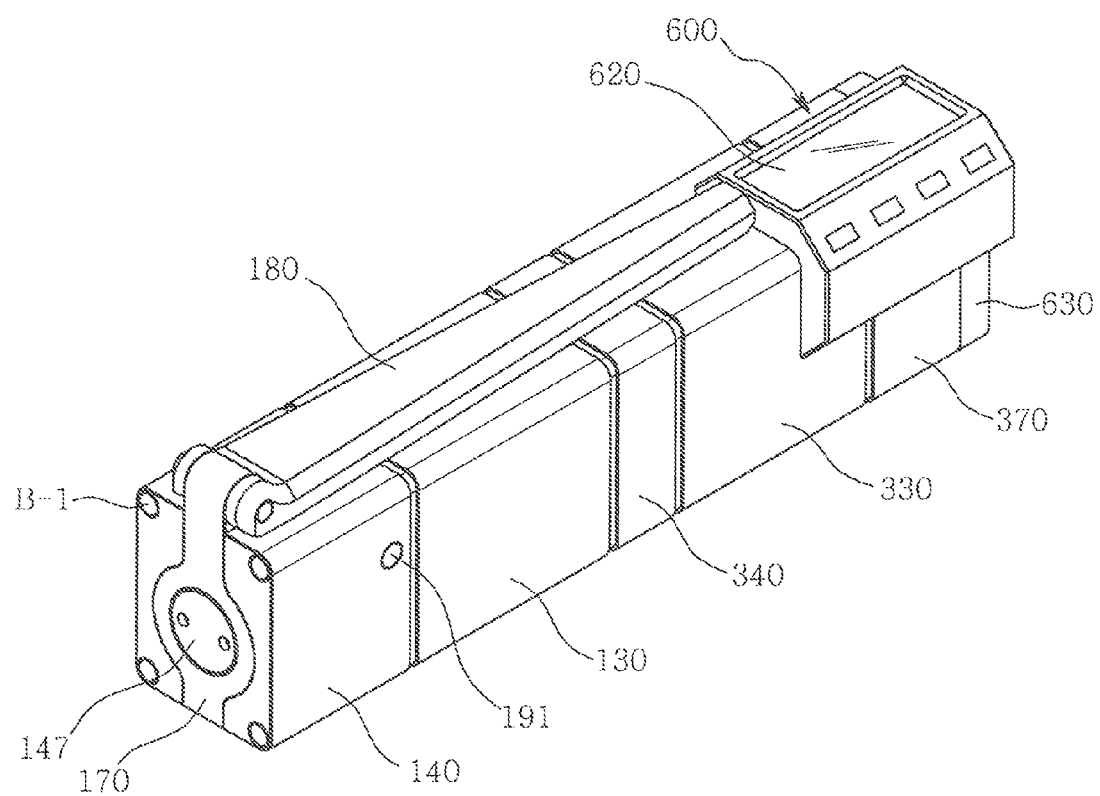
FIGS. 1 and 2 are perspective outlooks showing a portable generator according to an embodiment of the present invention.

Referring to FIGS. 1 through 23, the present invention is explained in detail below.

An aspect of the invention provides a portable generator.

The portable generator comprises a fluid pressure generator (100), a fluid pressure cylinder (200), a gas power generator (300), a gas generator (400), and a charger (600).

The fluid pressure generator (100) is for generating a fluid pressure by pumping and pressurized moving in a direction of non-compressible fluid in a fluid-storing space (120), and the fluid pressure generator (100) includes an airbag (110) for compensating a volume change by the pressurized moving of the non-compressible fluid.

The fluid pressure cylinder (200) is connected to the fluid pressure generator (100) and comprising a fluid pressure piston (211) forced to proceed by pressurizing the fluid in a cylinder tube (210) through the pressurized moving, a gas piston (220), and a piston rod (230) connecting the fluid pressure piston (211) and the gas piston (220).

The gas power generator (300) comprises a high pressure gas chamber (310) charged with a high pressure gas compressed by a volume of the piston rod (230) proceeding an initial charging pressure of the piston rod (230) imparted by the proceeding of the fluid pressure piston (211), the piston rod (230), and the gas piston (220) of the fluid pressure cylinder (200) and a cycle path (C/W) connecting a flow of the high pressure gas between the high pressure gas chamber (310) of the piston rod (230) and another high pressure gas chamber (310) in front of the piston through a gas generator (400) in the rear.

The gas generator (400) is for generating electricity with a flow of the high pressure gas moving in the high pressure gas chamber (310) as a power source.

The charger (600) comprises a PCB circuit board (610) for rectifying electricity generated by the gas generator (400) into a DC level and a display connected electrically to the PCB circuit board (610) so as to control a charging voltage and display a status of charging.

As shown in FIGS. 4, 5, 8, 10, and 11, the fluid pressure generator (100) may comprise a fluid container (130) receiving the airbag (110) in the fluid-storing space (120), and a valve body (140) assembled in front of the fluid container (130) and having a pump chamber (141) in a vertical direction therein, and a plunger (142) pressurizing and pumping the fluid stored in the pump chamber (141).

An inner surface of the fluid container (130) if formed in a shape of cylinder, is assembled sealingly between the rear side of the valve body (140) and the front side of the cylinder block (340) of the gas power generator (300).

The plunger (142) may be elevated by a return spring (143) assembled elastically at a bottom portion of the pump chamber (141), a top end thereof is restrained to be elevated protruding to a certain height by a cap nut (144) assembled to the valve body (140) through screws in a top portion of the pump chamber (141), and the pump chamber (141) is sealed tightly by a sealing ring (145) assembled in a bottom portion of the cap nut (144).

And in the valve body (140) are formed an intake check valve (160) opening for intake of the fluid of the fluid-storing space (120) into the pump chamber (141) by pumping of the plunger (142), and a discharge check valve (150) discharging the pressurized fluid to the cylinder tube (210) of the fluid pressure cylinder (200).

The discharge check valve (150) provides the fluid charged in the pump chamber (141) by the repeated pumping of the plunger (142) in a direction to the cylinder tube (210) of the fluid pressure cylinder (200), and the intake check valve (160) provides the fluid in the fluid-storing space (120) in a direction to the pump chamber (141) by the amount of fluid discharged from the pump chamber (141).

And, the discharge check valve (150) and the fluid-storing space (120) are connected with each other through an open-close flow path (121), and a fluid return valve (191) is installed in the open-close flow path (121) delivering the fluid in the cylinder tube (210) into the fluid-storing space (120).

The discharge check valve (150) and the intake check valve (160) are ball check valves, which are similar to conventional ones for opening and closing the flow path of a supporting body in a direction by functioning ball supported elastically by a spring.

Also, the plunger (142) may be provided between a protruding bolt (146) formed in a front end of the valve body (140) and a supporting nut (147) assembled in the protruding bolt (146) through screws and enabling pumping operation of elevation of axial-rotation pressurization of a pumping handle (180) a front end of which engages through axle to a top portion of a locking plate (170) so as to proceed and retreat over a specific distance through a disengagement prevention.

Figure 8:
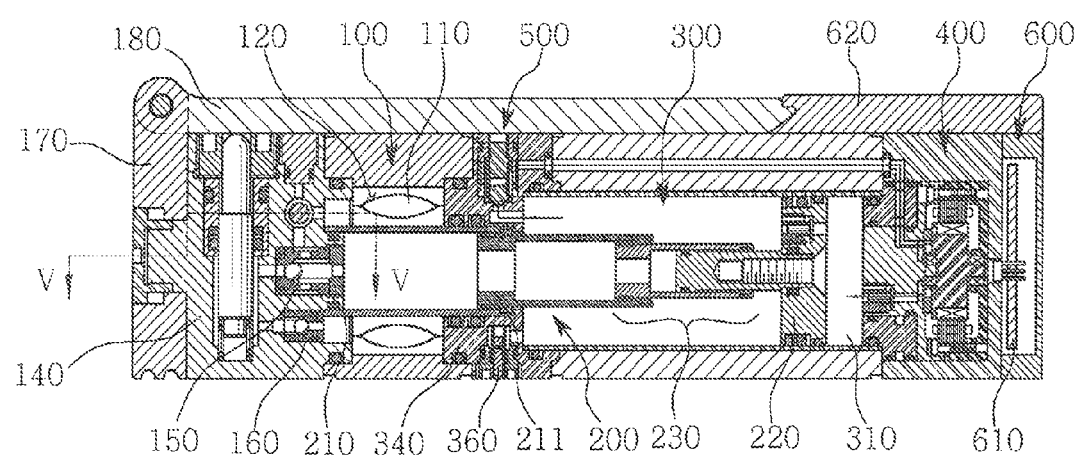
FIG. 8 is a cross-section view of the portable generator according to the invention in an assembled state along the line IV-IV in FIG. 3.

And as shown in FIG. 8, the pumping handle (180) is locked to a lock protrusion (181) formed in the rear portion of the hooking groove (621) in the display (620), and lowered while compressing the return spring (143) supporting the plunger (142) elastically, such that the folding state is fixed.

That is, as shown in FIG. 8, the lock protrusion (181) of the pumping handle (180) may be hooked to the hooking groove (621) of the display (620) by a retreat (push) of the locking plate (170) in a closed state such that the pumping handle (180) is maintained portable with the plunger (142) lowered and folded, and the pumping handle (180) is converted to a pumping state by disengaging the lock protrusion (181) of the pumping handle (180) by proceeding (pull) of the locking plate (170) and an upward rotation by elevation of the plunger (142) by elastic force of the return spring (143).

When folding the pumping handle (180), as shown in FIG. 1, the locking plate (170) may be retreated (pushed) into a contact groove formed around the protruding bolt (146) of the valve body (140) so as to be carried without further protrusions.

Figure 9:
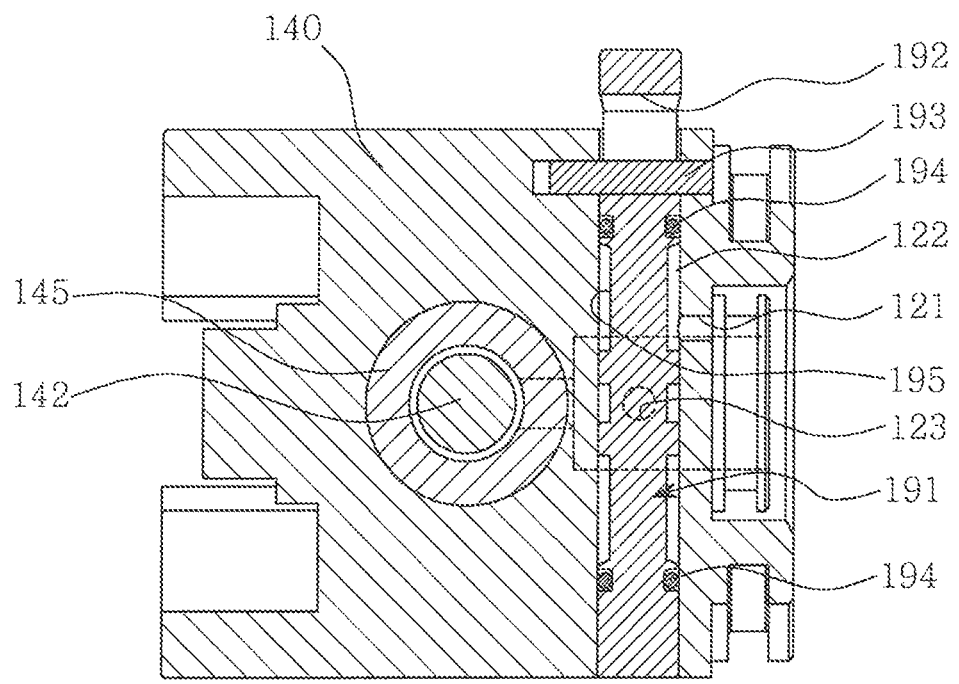
FIG. 9 is a cross-section view of a fluid return valve according to the invention in an assembled state along the line V-V in FIG. 3.
Figure 10:
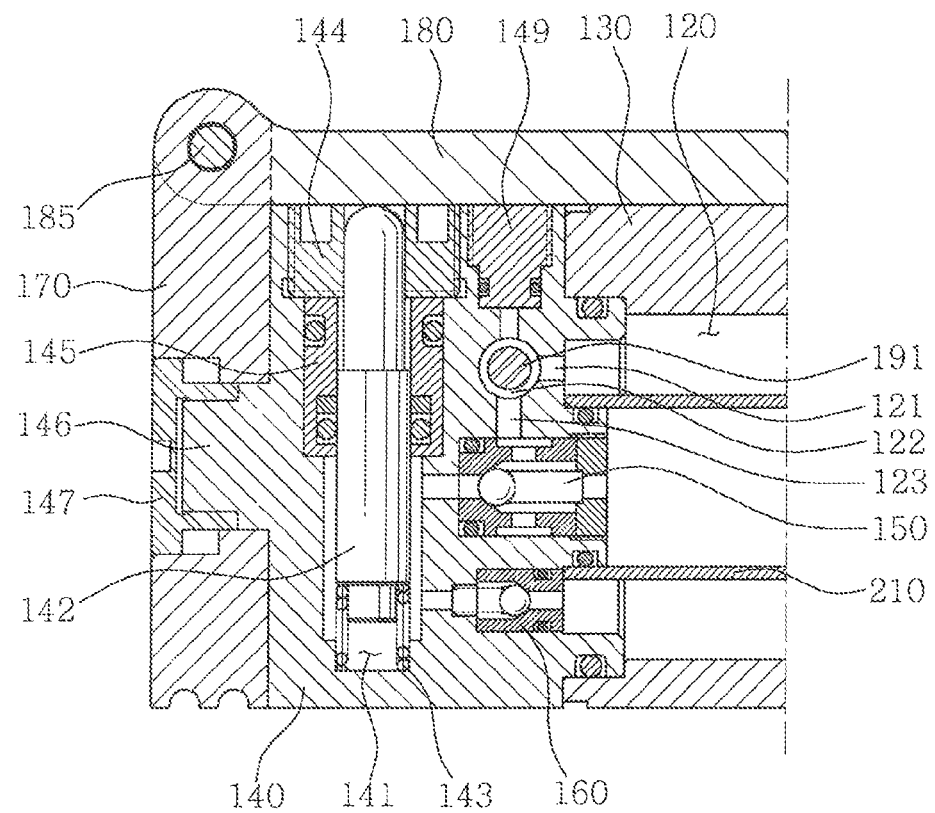
FIG. 10 is a partially enlarged view of FIG. 8.
Figure 11:
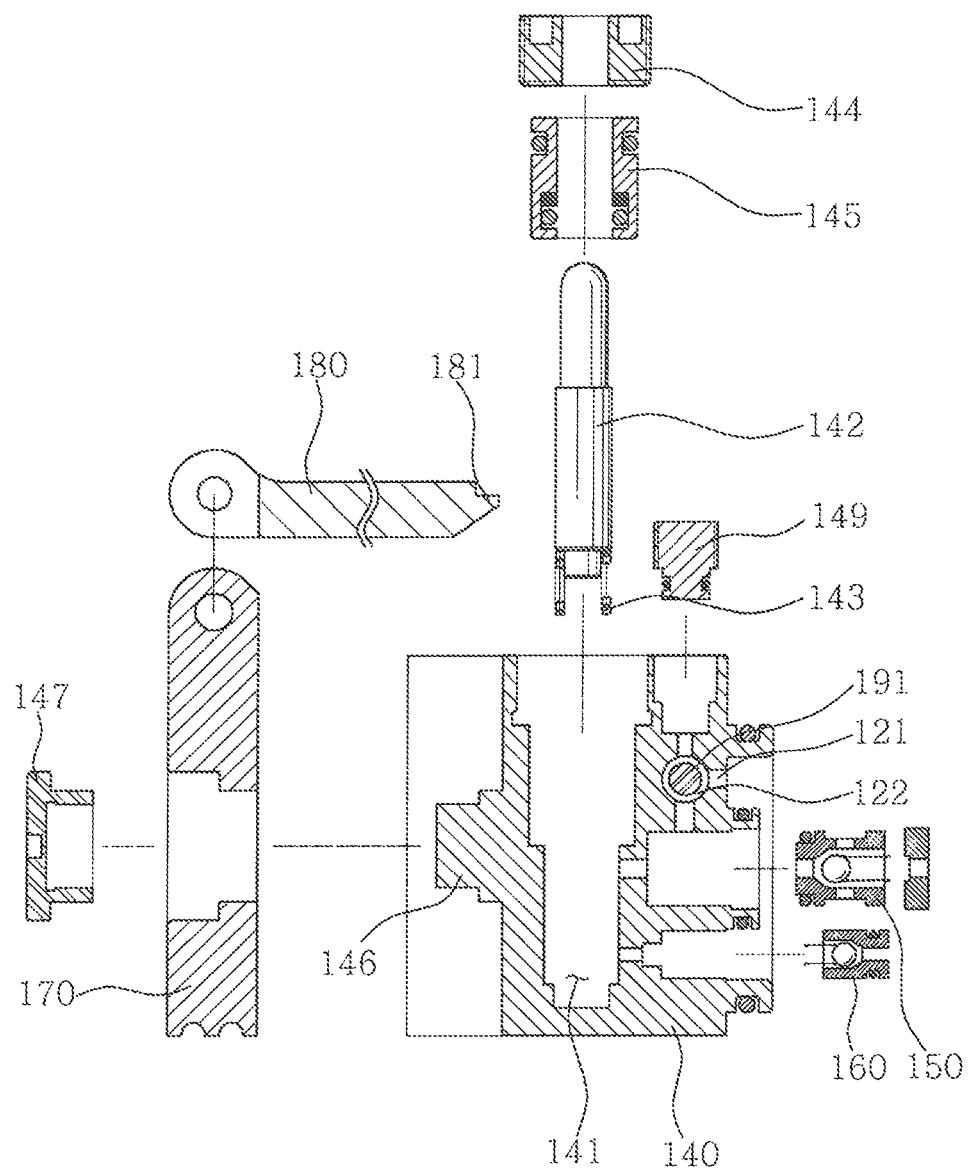
FIG. 11 is a cross-sectional exploded view showing components of FIG. 10.
Figure 12:
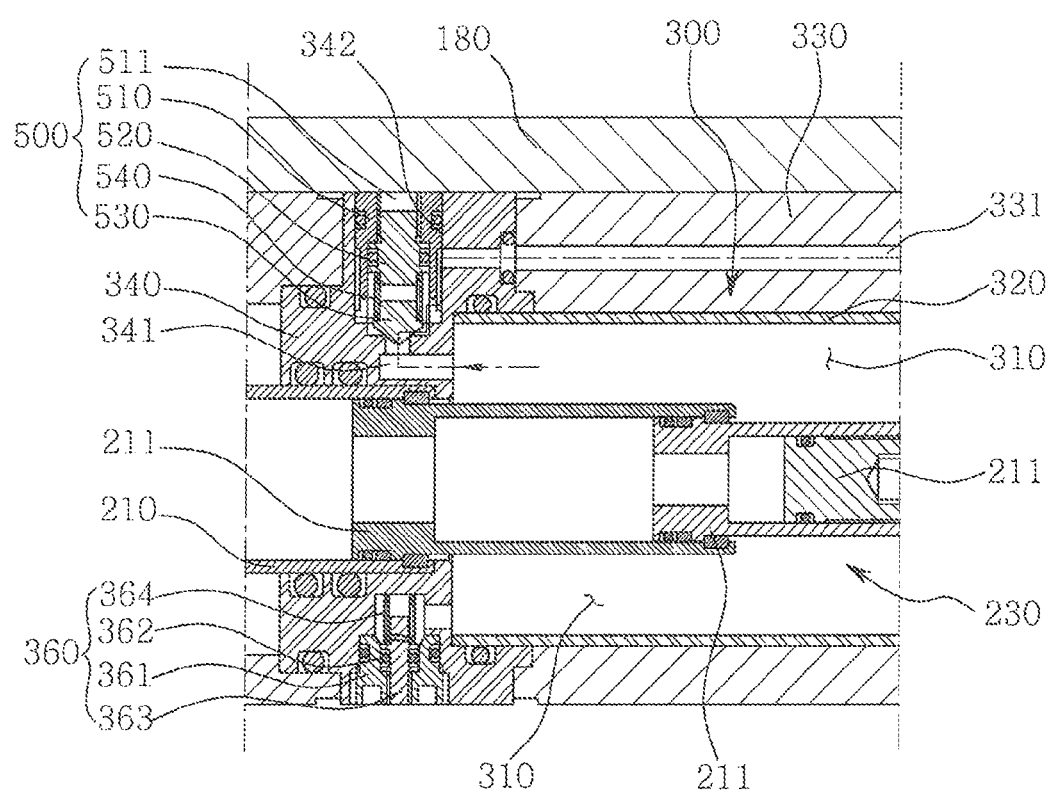
FIG. 12 is another partially enlarged view of FIG. 8.
Figure 13:
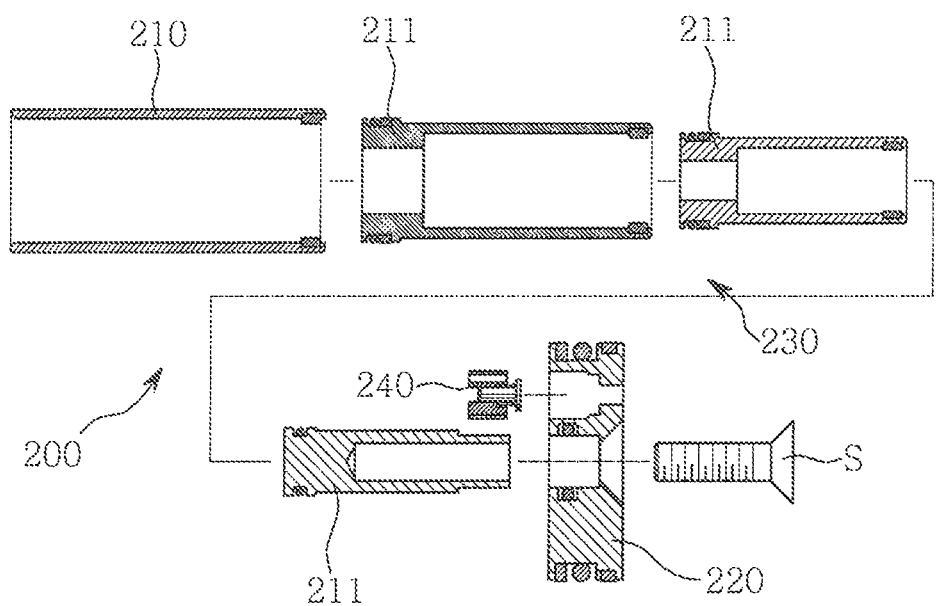
FIG. 13 is a cross-sectional exploded view of a fluid pressure cylinder according to an embodiment of the invention.
Figure 14:
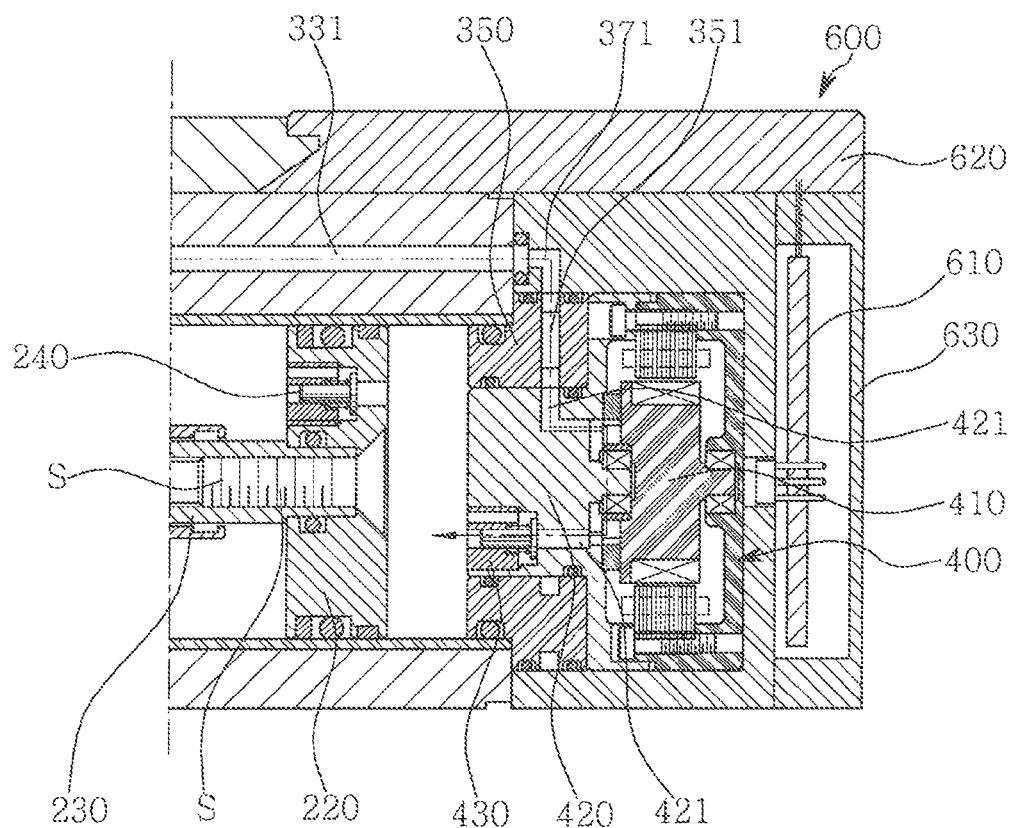
FIG. 14 is another partially enlarged view of FIG. 8.
Figure 15:
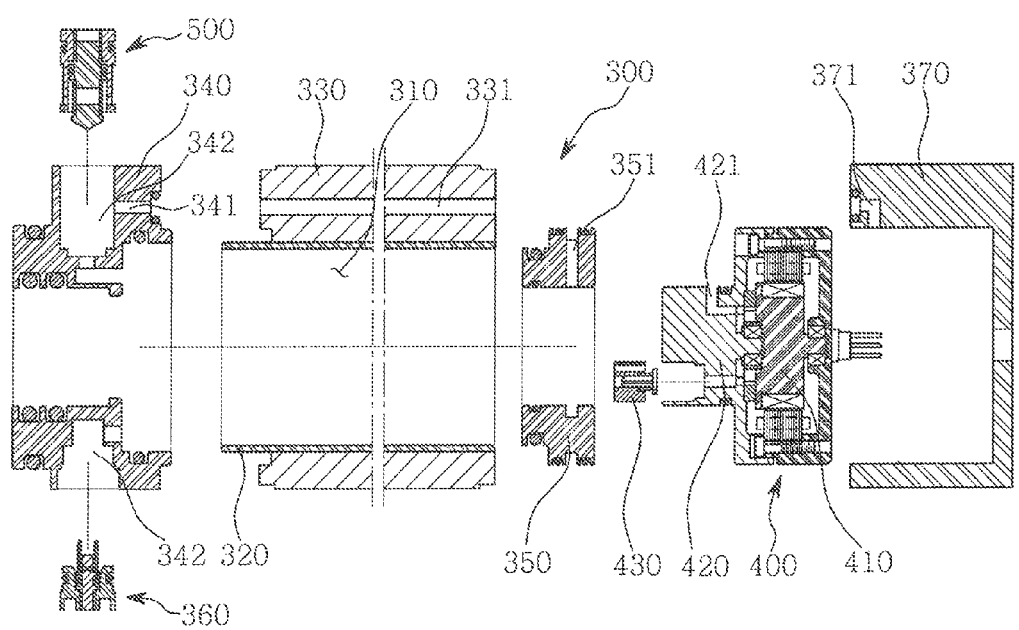
FIG. 15 is a cross-sectional exploded view of components of FIG. 14.
Figure 16:
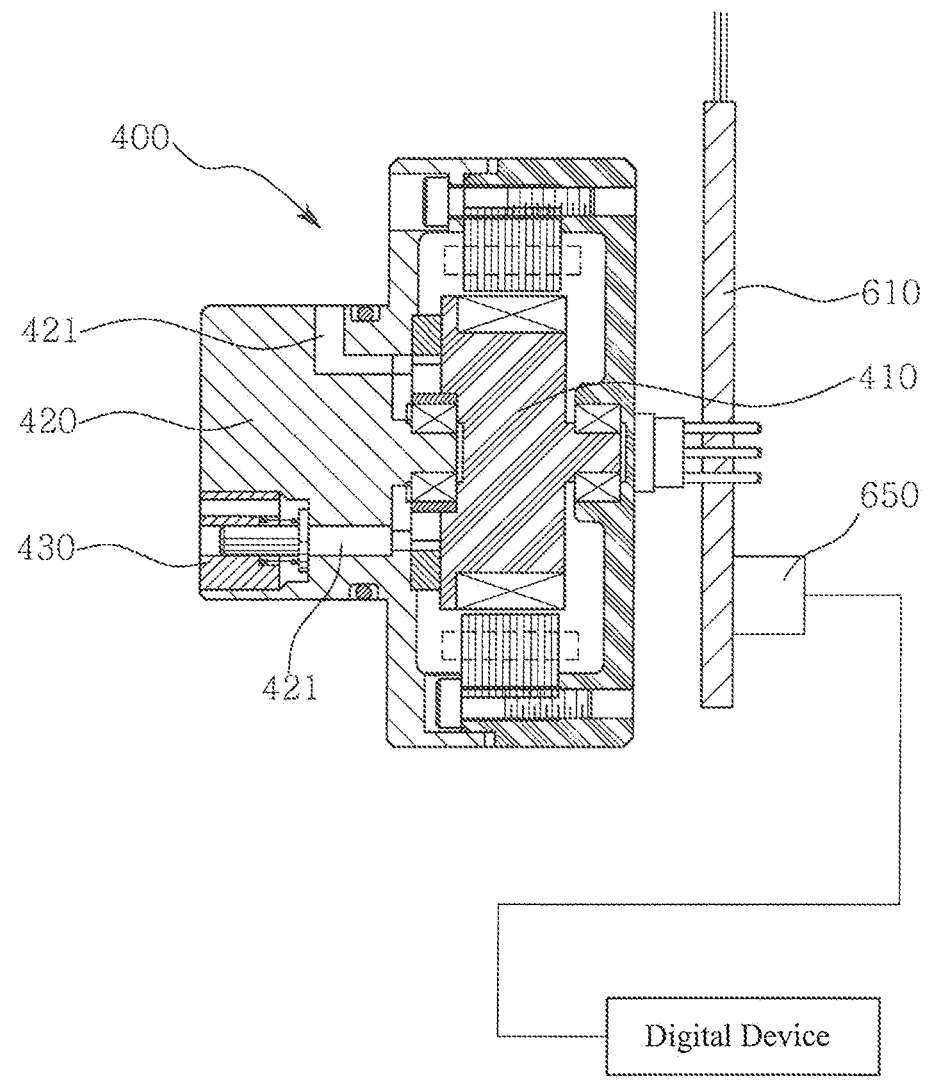
FIG. 16 is a cross-sectional view showing connection between a gas generator and a PCB board according to the invention, showing an exemplary state.

The fluid return valve (191), as shown in FIG. 9, is assembled to a horizontal flow path (122) of the valve body (140), and by the forward and backward moving operation the open-close flow path (121) opens or closes the connection of the fluid-storing space (120) and the cylinder chamber of the cylinder tube (210).

Figure 3:
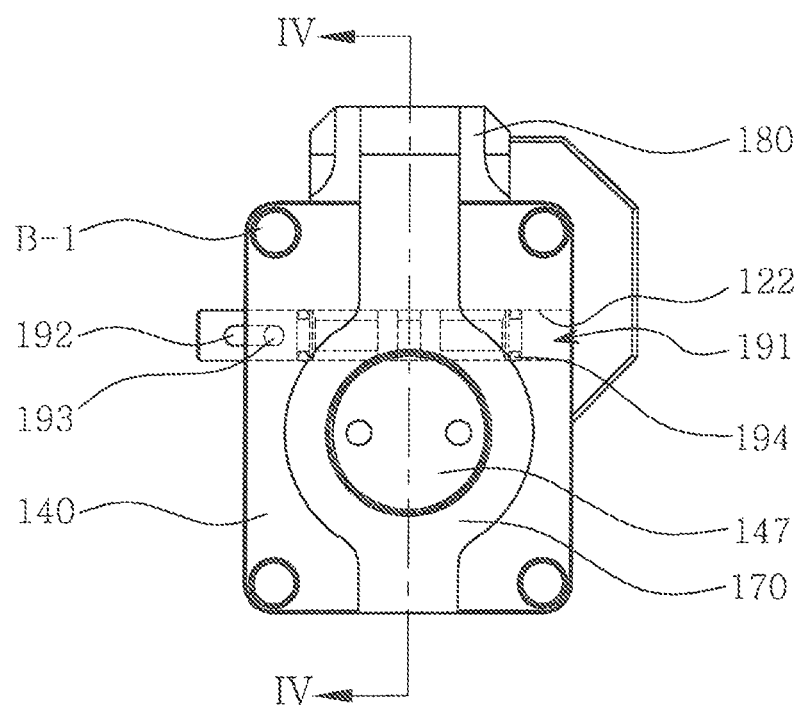
FIG. 3 is a left side view showing the portable generator in FIGS. 1 and 2.
Figure 4:
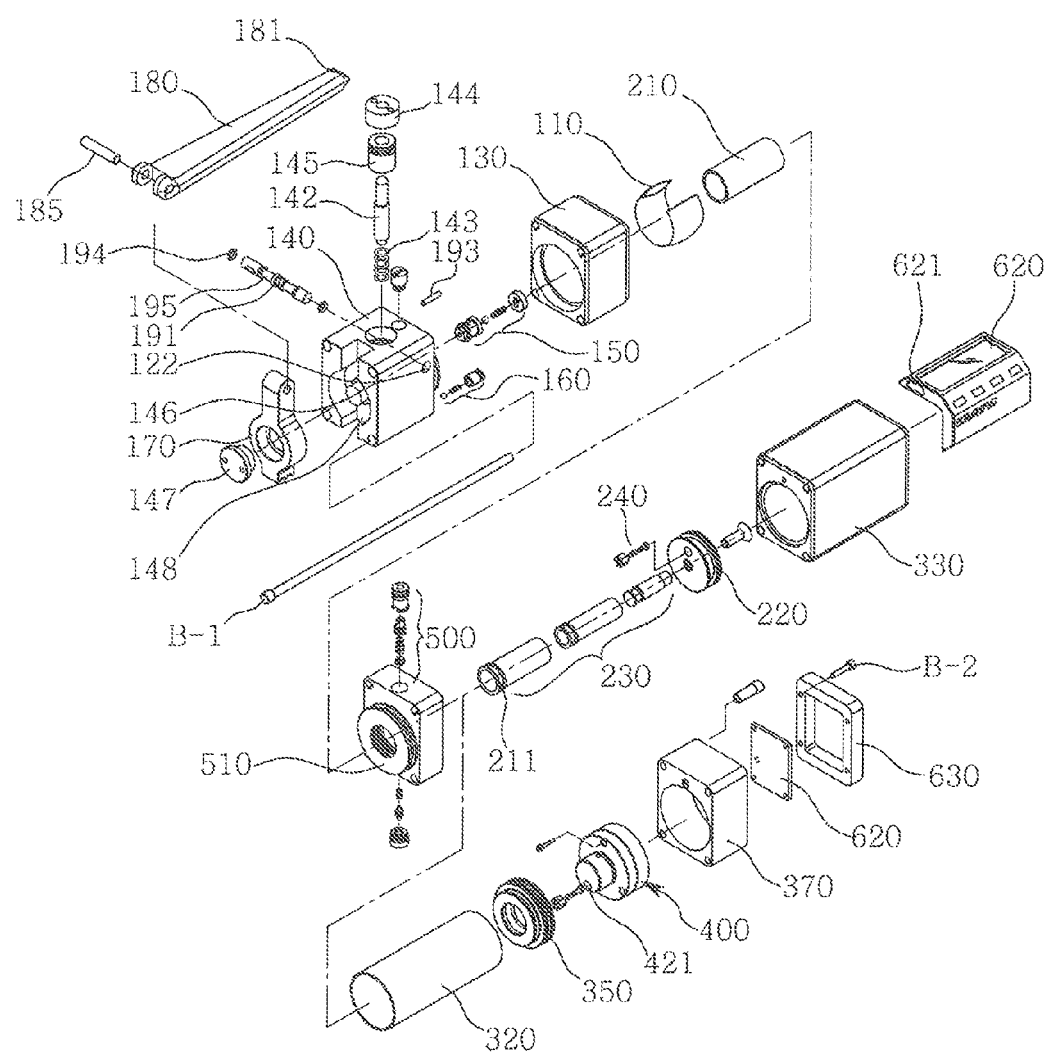
FIG. 4 is an exploded perspective view showing the portable generator in FIG. 1.
Figure 5:
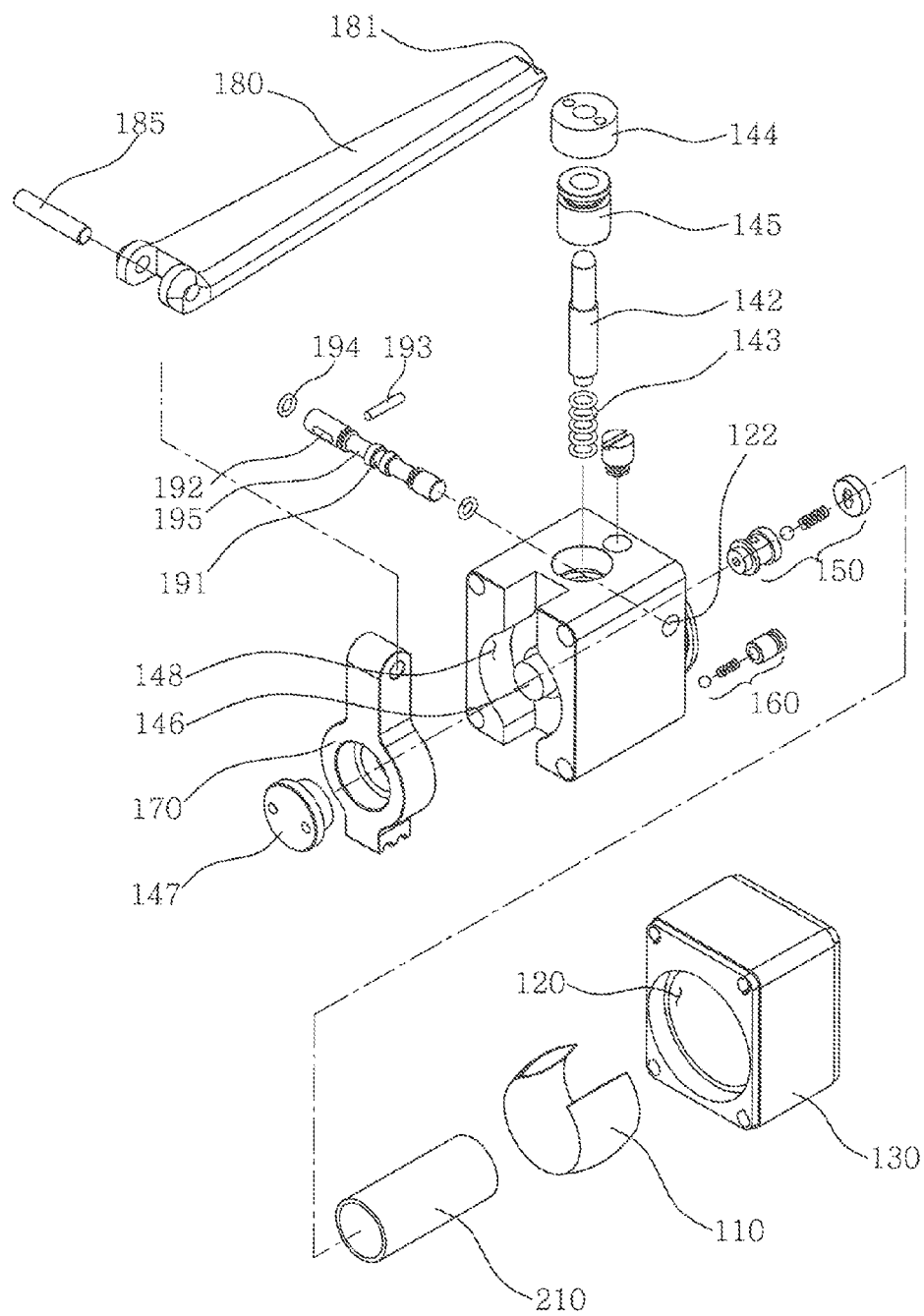
FIG. 5 is a partial view of FIG. 3, showing a fluid pressure generator according to an embodiment of the invention.
Figure 6:
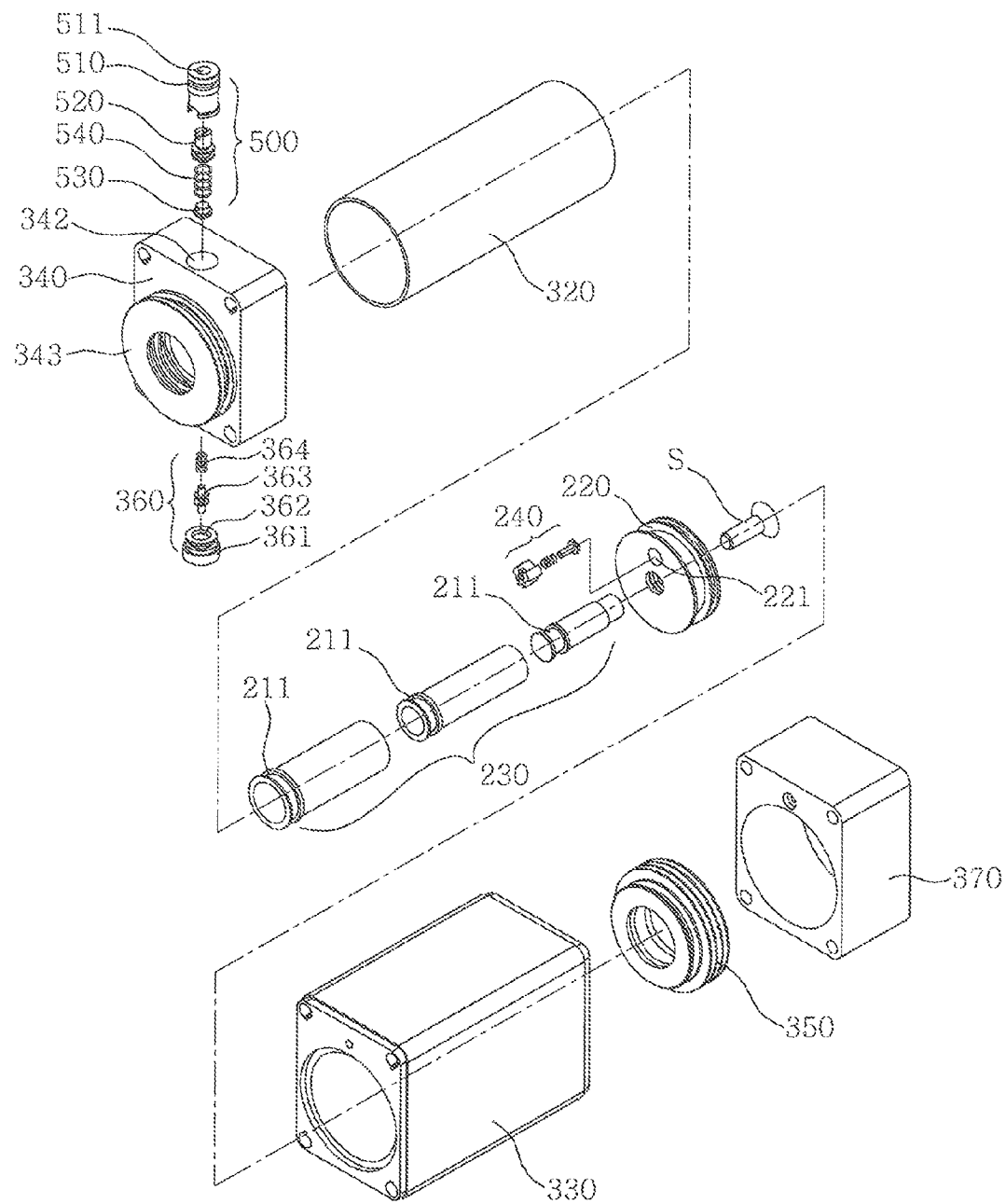
FIG. 6 is a partial view of FIG. 3, showing a fluid pressure cylinder and a gas power generator according to an embodiment of the invention.
Figure 7:
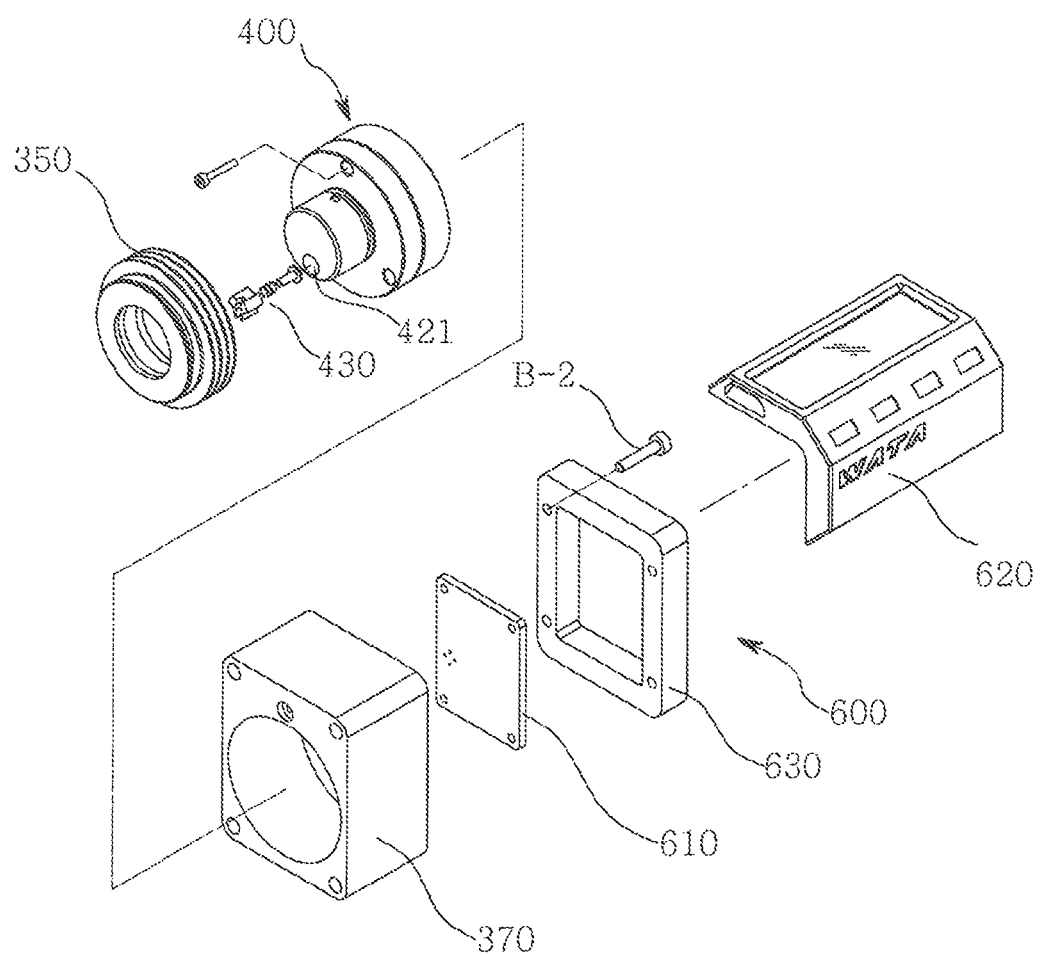
FIG. 7 is a partial view of FIG. 3, showing a gas generator and a charger according to an embodiment of the invention.

Referring to FIG. 3, the fluid return valve (191) has a shape of pole protruding by a specific length in a direction of width of the valve body (140), is inserted into the horizontal flow path (122), assembled to one side of a guiding oblong hole (192) in a fixing pin (193) assembled to the valve body (140), and prevented from moving horizontally and disengaging over a length of the guiding oblong hole (192).

Here, the fluid return valve (191) forms a plurality of circular grooves symmetrically on an outer surface so as to minimize the frictional force due to the forward and backward moving, on both outermost circular grooves is assembled a sealing ring (194) for sealing the front and rear side of the horizontal flow path (122), and the circular groove on one side forms a flow-path-connecting groove (195) for connecting the flow path of the discharge check valve (160) and the open-close flow path (121) through proceeding push.

On the other hand, the flow path of the discharge check valve (160), the open-close flow path (121), and the horizontal flow path (122) are connected to one another by a vertical flow path (123) formed vertically in the valve body (140), and the vertical flow path (123) is sealed with the outside by the cap bolt (149).

And, for the fluid storing of the fluid pressure generator (100), if the cap bolt (149) is unscrewed, the fluid return valve (191) is proceeded and opened to be connected with the open-close flow path (121), and then the piston rod (230) of the fluid pressure cylinder (200) is proceeded, then they are interconnected.

In such a state, when the fluid pressure piston (211) of the fluid pressure (200) and the piston rod (230) are proceeded to the maximum, the fluid is filled in the fluid-storing space (120), the pump chamber (140), the cylinder chamber of the cylinder tube (210) of the fluid pressure cylinder (200), by retreating the piston rod (230) the air is removed and overcharged fluid is discharged, and then the cap bolt (149) is screwed again and seals.

This technique for filling up the fluid is well known and therefore the details are omitted.

In certain embodiments, the fluid return valve (191) may comprise an open-close rod and an disengagement-preventing pin penetrating and assembled to an oblong hole through a rear portion of the open-close rod, and the open-close rod comprises a flow path connecting groove, in the front and rear sides of which sealing rings (145) for sealing a horizontal flow path connected with the open-close flow path (121) are assembled and which connects with a flow path of the discharge check valve (150) by proceeding (push).

As shown in FIGS. 4, 6, 8, 12, and 13, the fluid pressure cylinder (200) may comprise a cylinder tube (210) assembled sealingly as front and rear ends of the valve body (140) and a cylinder block (340) of the gas power generator (300), a fluid pressure piston (211) assembled sealingly to the cylinder tube (210) movably forward and backward, a piston rod (230) connected with the fluid pressure piston (211), and a gas piston (220) assembled to a front end of the piston rod (230) and moving sealingly along inner cylindrical surface of the gas container (330) of the gas power generator (300). Here, the cylinder tube (210) is assembled sealingly with the front side of the cylinder block (340) of the gas power generator (300) while receiving the discharge check valve (150).

Figure 20:
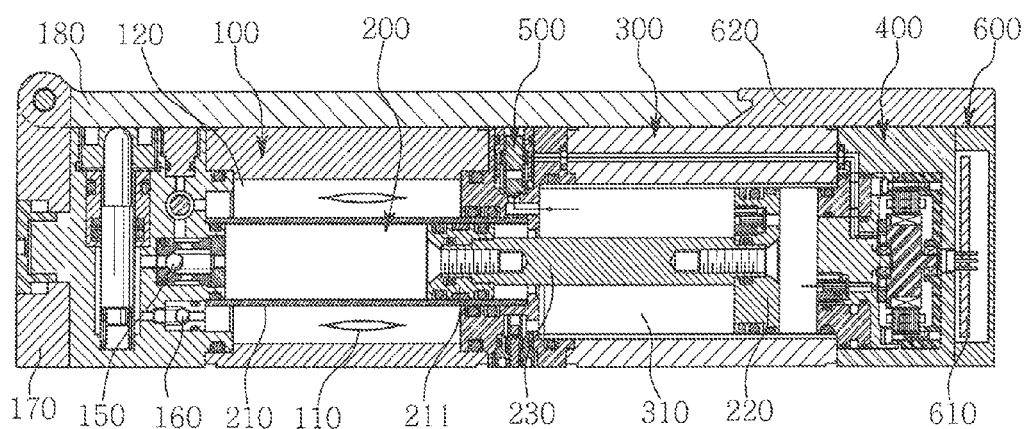
FIG. 20 is an assembled cross-sectional view showing another embodiment of the present invention.

And, the piston rod (230) moving sealingly in the inner surface of the cylinder tube (210), as shown in FIG. 20, to the rear side of which the fluid pressure piston (211) moving sealingly in the inner surface of the cylinder tube (210) is assembled and to the front side of which the gas piston (220) is assembled, may be assembled in a single rod, or the fluid pressure piston (211) may be formed by multiple-stage piston rod (230), which can be elongated or shortened according to forward and backward moving so as to reduce the entire length of the device.

That is, the piston rod (230) may comprise a multiple-stage piston rod (230) having a fluid pressure piston (211) at a rear end and engaging sealing serially with the inner cylindrical surface so as to reduce an entire length of the portable generator.

Such a multiple-stage piston rod (230) may have three stages, and the piston rod (230) having two-stage connections with the cylinder tube (210) is formed to have a hollow tube to which the fluid pressure is applied, and preferably the piston rod (230) may have a structure of solid pole with inside filled.

That is, the fluid which is being pressurized inside and moved forcefully acts on the inside of the multiple-stage piston rod (230), extending serially in the cylinder tube (210) and proceeding the gas piston (220), and it may be shortened by inserting the stages into inner surfaces on removing the fluid which was pressurized and delivered.

The cylinder tube (210) may be preferably formed with anti-abrasion stainless steel, and for sealing of surface of engaging and moving the fluid pressure piston (211) and the gas piston (220) may preferably comprise sealing rings assembled to groove formed on the outer surface thereof.

The gas piston (220) may comprise an equalizing-movement check valve for moving a high pressure gas toward the piston rod (230) for compressing equilibrium of the high pressure gas charged in a high pressure gas chamber (310) with respect to the proceeding direction.

The equalizing movement check valve (240) comprises a guide body assembled to an opening flow path (221) formed at one side thereof and a compression spring with one side supported by the guide body, and has a function to be supported by the other side of the compression spring, moved elastically, and close down the opening flow path (221), wherein the function of opening and closing of the flow path in a direction is same as in the conventional ball check valve.

As shown in FIGS. 4, 6, 8, 14, and 15, the gas power generator (300) may comprise a cylinder block (340) to which the fluid container (130) and the read end of the cylinder tube (210) are assembled, a gas container (330) forming a high pressure gas chamber (310) with a front end assembled with the cylinder block (340), an inner tube (320) assembled at an inner cylindrical surface of the gas container (330), a connecting ring (350) assembled to the gas container (330) and a rear end of the inner cylindrical surface, and an end cap (370) assembled sealingly with the outer cylindrical surface of the connecting ring (350) and receiving the gas generator (400) inside.

Here, the inner surface of the gas container (130) may be formed circular, and assembled tightly between the rear side of the cylinder block (340) and the front side of the end cap (370).

And, the circular inner tube (320) inserted in the circular inner surface is made of anti-abrasion stainless steel, and assembled sealingly by a sealing ring such as an O-ring in the rear side of the cylinder block (340) and the connecting ring (350).

The high pressure gas chamber (310) may form a cycle path (C/W) penetrating the cylinder block (340), the gas container (330), the connecting ring (350), and the end cap (370) by gas paths (341, 331, 351, 371) connected to one another sealingly, such that the front and rear chambers partitioned by the gas piston (220) are connected to each other.

Here, a regulator (500) is for controlling an amount and speed of the high pressure gas moving to the gas generator (400) may be provided in the cycle path (C/W).

Of course, the regulator (500) may be provided in a control valve chamber (342) disposed in the gas path (341) of the cylinder block (340).

As shown in FIGS. 4, 6, 8, 12, and 15, the regulator (500) may comprise a guide body (510) assembled to the control valve chamber (342) through screws, a control bolt (520) assembled to a central screw hole (511) of the guide body (510) through screws, an open-close needle (530) controlling the degree of opening of the gas path of the control valve chamber (342), and a compression spring (540) supported elastically between the control bolt and the open-close needle (530) and controlling elastically opening of the open-close needle (530).

Such a regulator (500) may provide power source to the gas generator (400) by controlling the extent of elevation by the screw rotation of the control bolt (520), controlling the extent of opening of the gas path (341) of the control valve chamber (342) by the elastic compression of the open-close needle (530) supported elastically by the compression spring (540), and controlling the moving amount and speed of the high pressure gas of the high pressure gas chamber (310).

The open-close needle (530) preferably has a tip end formed sharply in order to minimize the load of opening and closing of the high pressure gas moving through the gas path (341).

And, in certain embodiments, without adopting of the compression spring (540), the control bolt (520) and the open-close needle (530) may be formed integrally, and the moving amount and speed of the high pressure gas of the high pressure gas chamber (310) may be controlled by controlling the gap between the open-close needle (530) and the flow path.

On the other hand, the high pressure gas of the high pressure gas chamber (310) may be charged by a charging check valve (360) formed in the cylinder block (340).

Such a charging check valve (360) may be provided in the charging valve chamber (343) formed in a bottom portion facing against the control valve chamber (342) of the cylinder block (340).

The charging check valve (360) may comprise a sealing nut (361) assembled to the charging valve chamber (343) through screws, a sealing rod (363) assembled sealingly to a charging hole (362) of the sealing nut (361), and a compression spring (364) for supporting the sealing rod (363) elastically and closing sealingly the charging hole (362).

Charging of high pressure gas using the charging check valve (360) is accomplished by inserting the adapter of the high pressure gas tank into the charging hole (362) of the sealing nut (361), pushing the sealing rod (363) into the state of compressing the compression spring (364), and opening the flow path of the high pressure gas chamber (310).

The charging is obtained preferably when the piston rod (230) of the fluid pressure cylinder (200) and the gas piston (220) are retreated to the maximum, and the high pressure gas charged in the high pressure chamber (310) may be preferably nitrogen gas, which can be compressed and charged to the maximum in a given isolated space.

As shown in FIGS. 4, 7, 8, 15, and 16, the gas generator (400) uses the high pressure gas circulating in the gas power generator (300) as a power source and generates electricity.

The gas generator (400) may comprise a front cover (420) which is received in the end cap (370) of the gas power generator (300), supports rotation of a rotor (410) while assembled sealingly to the inner cylindrical surface of the connecting ring (350).

Here, in the front cover (420) is formed a gas path (421) connected to the gas path (351) of the connecting ring (350), and a reverse-rotation-preventing check valve (430) opening the high pressure gas circulating through the cycle path (C/W) of the gas power generator (300) to the high pressure gas chamber (310).

The reverse-rotation-preventing check valve (430) prevents reverse rotation through the gas path (421) circulating the high pressure gas in the rotor (410) of the gas generator (400) due to a high pressure rushing in during a first physical energy charging, which comprises a piston check valve including a guide body, assembled to the gas path (351), of the same structure as the equalizing movement check valve (240), a compression spring with an end supported by the guide body, and a piston valve which is supported by another end of the compression spring, moved elastically, and closes the gas path (351).

And, the pump housing (140) of the fluid pressure generator (100), the fluid container (130), the cylinder block (340) of the gas power generator (300), and the gas container (330), which are forming the outside of the present invention, are assembled sealingly with respect to one another by screws of long bolts (B-1) assembled to bolt holes penetrating though the corners and bolt screw holes of the end cap (370).

As shown in FIGS. 2, 4, 7, 8, and 14, the charger (600) comprises a PCB circuit board (610) for rectifying electricity generated by the gas generator (400) into a DC level and a display connected electrically to the PCB circuit board (610) so as to control a charging voltage and display a status of charging.

The PCB board (610) is received in the protecting cap (630) and connected to connecting terminals of the gas generator (400), and the PCB board is connected electrically to the display (620).

The protecting cap (630) is engaged at the rear side of the end cap (370) through a bolt (B-2).

The display (620) is assembled by partially enclosing the top and front portions of the end cap (370) and the protecting cap (630), and comprises a display connected electrically to the PCB board (620) and displaying of adjusting the charging voltage and charging state, a touch switch for turning ON/OFF of charging of a secondary battery of a portable digital device through a USB cable connected to a USB port (650), etc.

Figure 2:
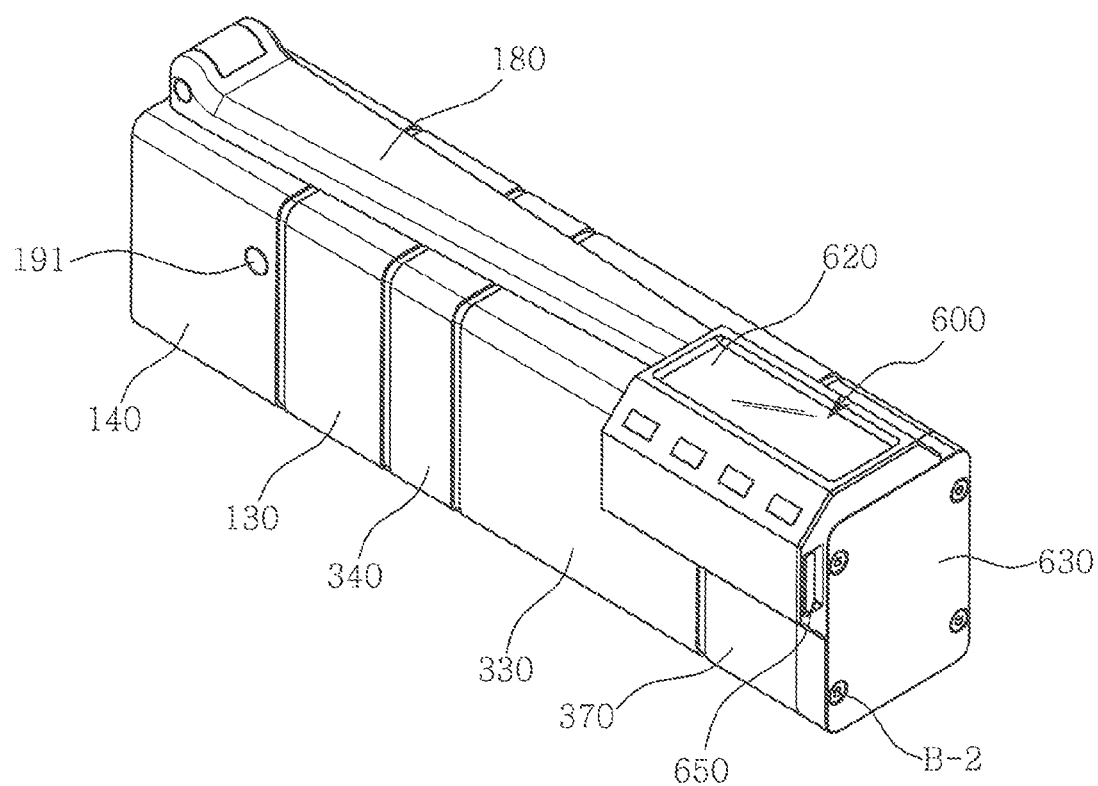

As shown in FIGS. 1 and 2, the invention may have a shape of a rectangular parallelepiped, but by forming the outside shapes of the fluid container (130), the valve body (140), the cylinder block (340), the gas container (330), the end cap (370), and the protecting cap (630) in shapes of circle, triangle, or hexagon the overall shape may be a cylindrical body, triangular body, or hexagonal body.

Referring the attached figures, operation and generating method of the invention are described in details.

Figure 17:
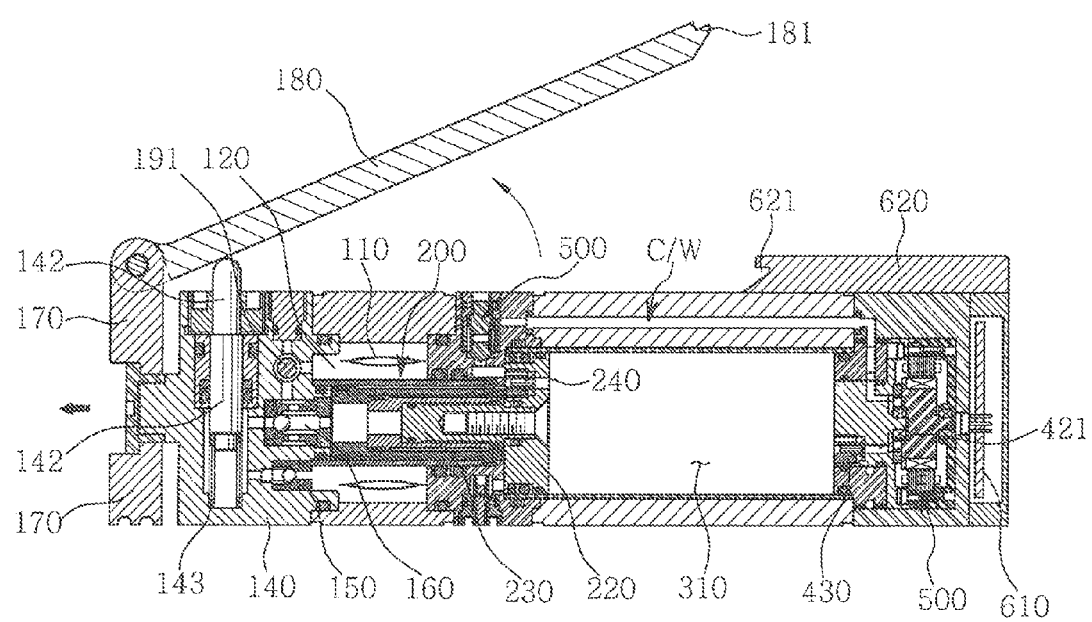
FIGS. 17 and 18 are diagrams showing operational states of the present invention.

First, as shown in FIG. 17, in a state that the z142 is lowered by hooking the z181 to the z621 of the z620, by disengaging the z181 of the z180 from the z621 of the z620 through proceeding (pulling) of the z170 and at the same time elevating the z142 through the elastic force of the z143, the z180 is rotated upward and it is changed to a pumping state.

In such a state, as shown in FIG. 9, the z191 is retreated and closes down the z123 of the z150, the z122 of the z140, and the z121 connected to z120.

Figure 21:
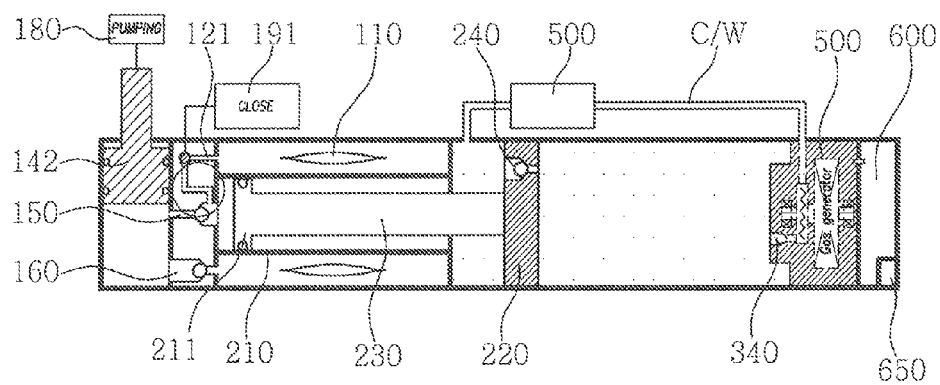
FIGS. 21 through 23 are schematic diagrams showing operations of the present invention.

Such a state, as shown in FIG. 21, the z230 connecting the z211 moving in the z210 of the z200 and the z220 is disposed into a state of being retreated to the maximum.

Figure 18:
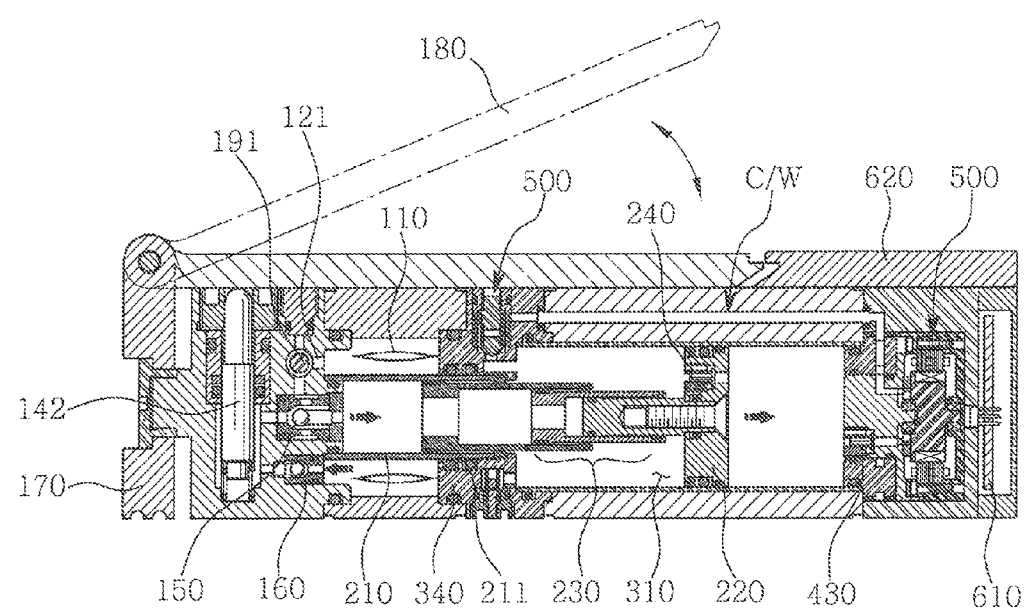

In such a state, as shown in FIG. 18, the z142 is pumped by repeating rotation of the z180.

Figure 22:
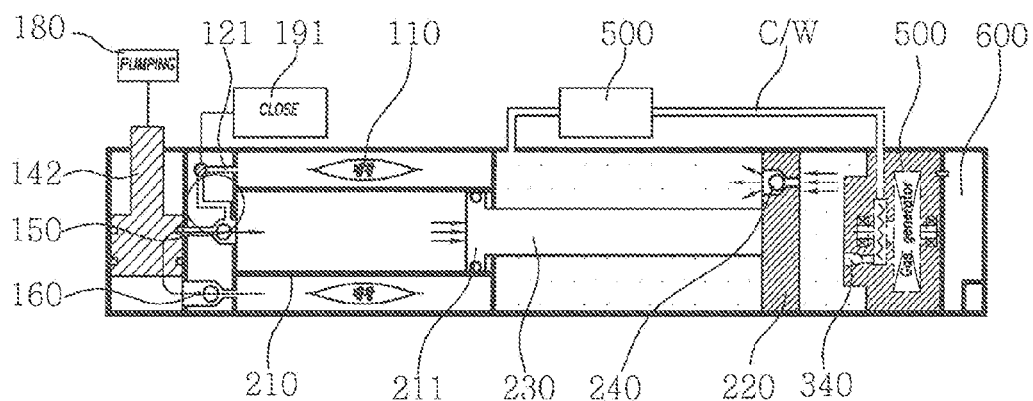

As a result, as shown in FIG. 22, the fluid in the z120 is pressurized and moved to the cylinder chamber of the z210 of the z200 through the z150 via the z141 through the z160, pushes the z230 of the z211, and proceeds the z220.

In such a process, the z220 proceeds compressing the high pressure gas charged in the z310 of the z300, and the high pressure gas charged and compressed in the front side of the z220 is blocked to flow to the z410 through the z430 formed in the z420 of the z400, and moved for compressing equilibrium to the z310 at the side of the z230 through the z240 of the z220.

And, the z110 received in the z120 expands by negative pressure generated by the forceful deliverance of the fluid and compensates the volume by the volume of the fluid removed. In such a state, the high pressure gas charged in the z310 generates reacting force by the magnitude of the reacting force of the z230 (cross-sectional area of piston rod×pressure in cylinder×stroke).

Such a reacting force generates a force for recovering the z220 and the z230, but the fluid pushing the z230 blocks forcefully the return of the z120 by the z191, such that since the force of the fluid pushing the z230 and the reacting force stored in compressing of the z230 are same the proceeded state is maintained.

If destroying the force of the fluid pushing the z230, the compressed reacting force of the z230 acts, and the high pressure gas retreats (returns) the z220 and the z230.

Figure 19:
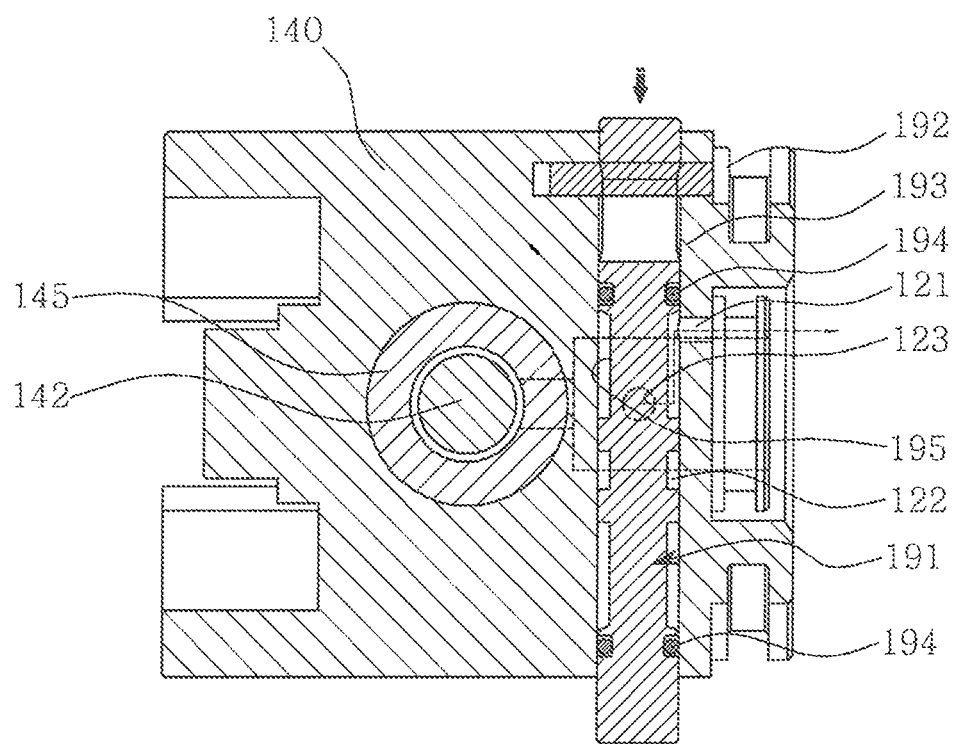
FIG. 19 is a diagram showing an advanced state of a fluid return valve of the present invention.
Figure 23:
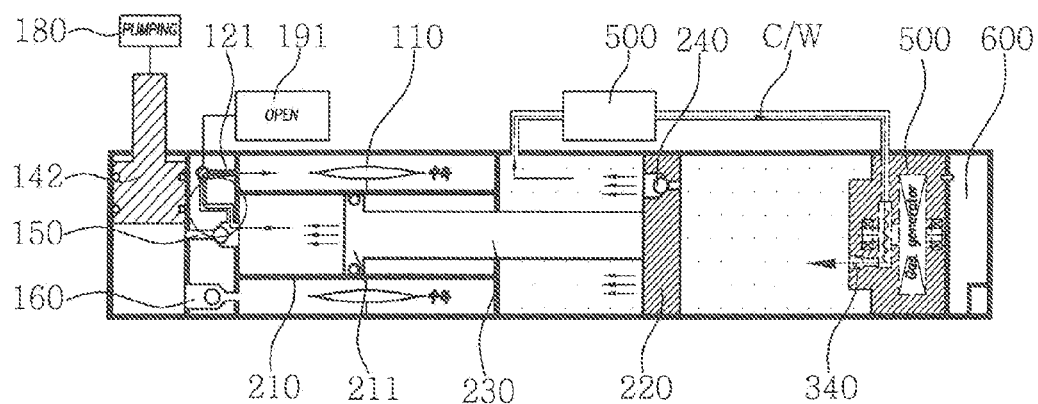

That is, as shown in FIG. 19, if pushing the z191 to proceed, the z123, the z122, and the z121 connecting the z150 and the z120 get interconnected. As a result, as shown in FIG. 23, if the negative pressure of the z120 is destroyed and at the same time the expanded z110 is shrunk, the fluid in the z210 returns to the z120 through the z150, and the z220 compresses the high pressure gas in the z310 at the side of the z230, and retreats.

Here, the compressing high pressure gas moves to the z310 at the front side of the z220 through the cycle path (C/W) extended and formed to the z341 of the z340, the z330, the z350, and the gas paths (331, 351, 371) of the z370 via the z421 of the z400 and the z430, rotates the z410 of the z400, and generates electricity.

The moving speed and amount of such high pressure gas is controlled by the retreating speed of the z220 through the control of the z500 of the z342.

Such a z500 is provided by controlling of the extent of opening of the flow path of the z342. That is, the z500 can control the moving amount and speed of the circulating high pressure gas by the controlling of the gap between the z530 supported elastically by the z540 and the flow path by controlling the extent of elevation of the z520 through rotating of the screw.

According to the operational principle of the invention as in the above, non-compressible fluid charged by an external force applied physically is forcefully compressed and delivered to the cylinder chamber by changing the fluid flow of the discharge and intake check valves (150, 160) connected to the z141 to the cylinder chamber of the z200 by pumping, pushing the z211, the z220, and the z230 by the compressive force so as to push and move into the z310 in which the high pressure gas is charged and sealed.

The z220 that was proceeded thus proceeds and moves into the z310, having energy as much as the reacting force of the z230 (cross-sectional area of piston rod×pressure in cylinder×stroke), and the high pressure gas compressed in the front side of the z220 is proceeded and positioned into a process of moving into the z310 of the z230 through the z240 of the z220 for compressing equilibrium.

In such maximally proceeded state of the z220, the z191 disposed in the z200 is pushed down and changes the flow path of the z150 into the z120, releasing the state supporting the fluid pressurized and delivered to the cylinder chamber.

As the compressing equilibrium of the compressed high pressure gas is destroyed by such a releasing of the fluid pressure and the piston retreats due to the reacting force of the compressed high pressure gas and compresses the high pressure gas charged in the rear side of the z220, the high pressure gas which is compressed on retreating is delivered to the z400 through the cycle path (C/W), rotates the z410, generates electricity, and circulates to the z210 through the z430.

Another aspect of the invention provides a generating method for a portable generator, The generating method for a portable generator comprises serially performed steps for:

(a) pressurizing fluid charged in a cylinder chamber by pumping of non-compressible fluid charged in the fluid-storing space (120) and proceeding a fluid pressure piston (211) and a piston rod (230) that are retreated to the rearmost position by the compressing power;

(b) producing a resisting force (cross-sectional area of the piston rod (230)×pressure in the cylinder×stroke) against a cross-section of the piston rod (230) by pushing in the gas piston (220) assembled in a front end axle (piston rod (230)) maximally into the high pressure gas chamber (310) where the high pressure gas is charged through the proceeding of the piston rod (230);

(c) storing energy applied physically while the gas piston (220) in the high pressure gas chamber (310) proceeds to the maximum and the high pressure gas is not compressed by the gas piston (220), maintains the compression equilibrium through an equalizing movement check valve (240) of the gas piston (220), and is moved to the high pressure gas chamber (310) in the side of the piston rod (230);

(d) releasing a stalled moving state of the fluid that is pressurized, delivered, and supported by pushing the fluid pressure piston (211) and the piston rod (230) and destroying the equilibrium of fluid-supporting force pushing the gas piston (220); and (e) moving through the cycle path (C/W) the high pressure gas compressed by closing the equalizing movement check valve (240) of the gas piston (220) by retreating of the gas piston (220) by the resisting force (cross-sectional area of the piston rod (230)×pressure in the cylinder×stroke) of the compressed high pressure gas due to the destroying of the fluid-supporting force, and generating electricity using the rotor of the gas generator (400) as a rotating power.

In the step (a), the loss of fluid moved forcefully from the fluid-storing space (120) to the cylinder chamber by pumping may be compensated by expansion of an airbag (110) received in the fluid-storing space (120).

In the step (d), the fluid which was moved forcefully may return by converting a flow path of the fluid pressure piston (211) to a flow path of the fluid-storing space (120).

In the step (e), moving amount and speed of the high pressure gas may be controlled by controlling the high pressure gas circulating through the cycle path (C/W) by a regulator (500).

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A portable generator comprising:
   a fluid pressure generator for generating a fluid pressure by pumping and pressurized moving in a direction of non-compressible fluid in a fluid-storing space, the fluid pressure generator including an airbag for compensating a volume change by the pressurized moving of the non-compressible fluid;
   a fluid pressure cylinder connected to the fluid pressure generator and comprising a fluid pressure piston forced to proceed by pressurizing the fluid in a cylinder tube through the pressurized moving, a gas piston, and a piston rod connecting the fluid pressure piston and the gas piston;

a gas power generator comprising a high pressure gas chamber charged with a high pressure gas compressed by a volume of the piston rod proceeding an initial charging pressure of the piston rod imparted by the proceeding of the fluid pressure piston, the piston rod, and the gas piston of the fluid pressure cylinder and a cycle path connecting a flow of the high pressure gas between the high pressure gas chamber of the piston rod and another high pressure gas chamber in front of the piston through a gas generator in the rear;

the gas generator for generating electricity with a flow of the high pressure gas moving in the high pressure gas chamber as a power source; and a charger comprising a PCB circuit board for rectifying electricity generated by the gas generator into a DC level and a display connected electrically to the PCB circuit board so as to control a charging voltage and display a status of charging.

2. The portable generator of claim 1, wherein the fluid pressure generator comprises a fluid container receiving the airbag in the fluid-storing space, and a valve body assembled in front of the fluid container and having a pump chamber in a vertical direction therein, a plunger pressurizing and pumping the fluid stored in the pump chamber, an intake check valve opening for intake of the fluid of the fluid-storing space into the pump chamber by pumping of the plunger, a discharge check valve discharging the pressurized fluid to the cylinder tube of the fluid pressure cylinder, an open-close flow path connecting the discharge check valve and the fluid-storing space, and a fluid return valve installed in the open-close flow path delivering the fluid in the cylinder tube into the fluid-storing space.

3. The portable generator of claim 2, wherein the plunger is elevated by a return spring assembled elastically at a bottom portion of the pump chamber, a top end thereof is restrained to be elevated protruding to a certain height by a cap nut assembled to the valve body through screws in a top portion of the pump chamber, and the pump chamber is sealed tightly by a sealing ring assembled in a bottom portion of the cap nut.

4. The portable generator of claim 3, wherein the plunger is provided between a protruding bolt formed in a front end of the valve body and a supporting nut assembled in the protruding bolt through screws and enabling pumping operation of elevation of axial-rotation pressurization of a pumping handle a front end of which engages through axle to a top portion of a locking plate so as to proceed and retreat over a specific distance through a disengagement prevention.

5. The portable generator of claim 4, wherein a lock protrusion of the pumping handle is hooked to a hooking groove of the display by a retreat (push) of the locking plate in a closed state such that the pumping handle is maintained portable with the plunger lowered and folded, and the pumping handle is converted to a pumping state by disengaging the lock protrusion of the pumping handle by proceeding (pull) of the locking plate and an upward rotation by elevation of the plunger by elastic force of the return spring.

6. The portable generator of claim 4, wherein the locking plate is retreated (pushed) into a contact groove formed around the protruding bolt of the valve body so as to be carried without further protrusions.

7. The portable generator of claim 2, wherein the fluid return valve comprises an open-close rod and an disengagement-preventing pin penetrating and assembled to an oblong hole through a rear portion of the open-close rod, wherein the open-close rod comprises a flow path connecting groove, in the front and rear sides of which sealing rings for sealing a horizontal flow path connected with the open-close flow path are assembled and which connects with a flow path of the discharge check valve by proceeding (push).

8. The portable generator of claim 2, wherein the fluid pressure cylinder comprises a cylinder tube assembled sealingly as front and rear ends of the valve body and a cylinder block of the gas power generator while receiving the discharge check valve, a fluid pressure piston assembled sealingly to the cylinder tube movably forward and backward, a piston rod connected with the fluid pressure piston, and a gas piston assembled to a front end of the piston rod and moving sealingly along inner cylindrical surface of the gas container of the gas power generator.

9. The portable generator of claim 8, wherein the piston rod comprises a multiple-stage piston rod having a fluid pressure piston at a rear end and engaging sealing serially with the inner cylindrical surface so as to reduce an entire length of the portable generator.

10. The portable generator of claim 8, wherein the gas piston comprises an equalizing-movement check valve for moving a high pressure gas toward the piston rod for compressing equilibrium of the high pressure gas charged in a high pressure gas chamber with respect to the proceeding direction.

11. The portable generator of claim 1, wherein the gas power generator comprises a cylinder block, a gas container forming a high pressure gas chamber with a front end assembled with the cylinder block, an inner tube assembled at an inner cylindrical surface of the gas container, a connecting ring assembled to the gas container and a rear end of the inner cylindrical surface, and an end cap assembled sealingly with the outer cylindrical surface of the connecting ring and receiving the gas generator inside.

12. The portable generator of claim 11, wherein the high pressure gas chamber forms a cycle path penetrating the cylinder block, the gas container, the connecting ring, and the end cap by gas paths connected to one another sealingly, such that the front and rear chambers of the piston are connected to each other.

13. The portable generator of claim 1, wherein a regulator for controlling a amount and speed of the high pressure gas moving to the gas generator.

14. The portable generator of claim 13, wherein the regulator is provided in a control valve chamber disposed in the gas path of the cylinder block.

15. The portable generator of claim 14, wherein the regulator comprises a guide body assembled to the control valve chamber through screws, a control bolt assembled to a central screw hole of the guide body through screws, an open-close needle controlling the degree of opening of the gas path of the control valve chamber, and a compression spring supported elastically between the control bolt and the open-close needle and controlling elastically opening of the open-close needle.

16. The portable generator of claim 15, wherein the control bolt and the open-close needle are formed integrally.

17. The portable generator of claim 11, wherein a charging check valve for charging the high pressure gas in the high pressure gas chamber is provided the cylinder block.

18. The portable generator of claim 17, wherein the charging check valve comprises a sealing nut assembled to a valve chamber penetrating the high pressure gas chamber through screws, a sealing rod assembled sealingly to a charging hole of the sealing nut, and a compression spring for supporting the sealing rod elastically and closing sealingly the charging hole.

19. The portable generator of claim 1, wherein the gas generator comprises a front cover which is received in the end cap of the gas power generator, supports rotation of a rotor while assembled and contacted to the inner cylindrical surface of the connecting ring, is connected to the gas path of the connecting ring, and communicates with the high pressure gas chamber in the front side of the gas piston, and a reverse-rotation-preventing check valve which is installed in the gas path of the front cover and prevents reverse rotation of the rotor due to a high pressure rushing in when a first physical energy charging.

20. A generating method for a portable generator, comprising serially performed steps for:
   (a) pressurizing fluid charged in a cylinder chamber by pumping of non-compressible fluid charged in the fluid-storing space and proceeding a fluid pressure piston and a piston rod that are retreated to the rearmost position by the compressing power;
   (b) producing a resisting force (cross-sectional area of the piston rod×pressure in the cylinder×stroke) against a cross-section of the piston rod by pushing in the gas piston assembled in a front end axle (piston rod) maximally into the high pressure gas chamber where the high pressure gas is charged through the proceeding of the piston rod;
   (c) storing energy applied physically while the gas piston in the high pressure gas chamber proceeds to the maximum and the high pressure gas is not compressed by the gas piston, maintains the compression equilibrium through an equalizing movement check valve of the gas piston, and is moved to the high pressure gas chamber in the side of the piston rod;
   (d) releasing a stalled moving state of the fluid that is pressurized, delivered, and supported by pushing the fluid pressure piston and the piston rod and destroying the equilibrium of fluid-supporting force pushing the gas piston; and
   (e) moving through the cycle path the high pressure gas compressed by closing the equalizing movement check valve of the gas piston by retreating of the gas piston by the resisting force (cross-sectional area of the piston rod×pressure in the cylinder×stroke) of the compressed high pressure gas due to the destroying of the fluid-supporting force, and generating electricity using the rotor of the gas generator as a rotating power.

21. The generating method of claim 20, wherein in the step (a), the loss of fluid moved forcefully from the fluid-storing space to the cylinder chamber by pumping is compensated by expansion of an airbag received in the fluid-storing space.

22. The generating method of claim 20, wherein in the step (d), the fluid which was moved forcefully returns by converting a flow path of the fluid pressure piston to a flow path of the fluid-storing space.

23. The generating method of claim 20, wherein in the step (e), moving amount and speed of the high pressure gas are controlled by controlling the high pressure gas circulating through the cycle path by a regulator.

* * * * *